(12) United States Patent
Knaub et al.

(10) Patent No.: US 6,378,826 B1
(45) Date of Patent: Apr. 30, 2002

(54) CONTROLLER FOR GAMES OR SIMULATION PROGRAMS WITH CLAMP FOR DESKTOP MOUNTING

(75) Inventors: David R. Knaub; Philip A. Frank; Jason E. Denner, all of Portland; Michael D. Holloway, Beavertown; Lonnie D. Milton, Mulino, all of OR (US)

(73) Assignee: Guillemot Corporation, La Gacilly Cedex (FR)

( * ) Notice: Subject to any disclaimer, the term of this patent is extended or adjusted under 35 U.S.C. 154(b) by 0 days.

(21) Appl. No.: 09/085,338

(22) Filed: May 26, 1998

(51) Int. Cl.[7] .............................. A47B 96/06; F16B 1/00
(52) U.S. Cl. ................................. 248/229.21; 248/229.1
(58) Field of Search ................... 74/491, 492, 471 XY; 248/222.51, 229.1, 226.11, 229.21

(56) References Cited

U.S. PATENT DOCUMENTS

| | | | | |
|---|---|---|---|---|
| 5,727,188 A | * | 3/1998 | Hayes | 395/500 |
| 5,964,440 A | * | 10/1999 | An et al. | 248/316.2 |
| 6,017,008 A | * | 1/2000 | Farley | 248/229.21 |
| 6,119,991 A | * | 9/2000 | Thorne, III et al. | 248/229.2 |

* cited by examiner

Primary Examiner—David Fenstermacher

(74) Attorney, Agent, or Firm—Marger Johnson & McCollom, PC

(57) ABSTRACT

The present invention concerns a controller for use with racing games and simulations running on a personal computer which includes a specially adapted attachment mechanism for desktop mounting. A particular embodiment of the controller includes a housing for removably attaching the controller to a desktop and a rotatable steering wheel mounted to the housing for manipulating the game object. An clamping assembly is received in the housing. An adjustable arm is pivotally connected to the clamping assembly and includes a substantially curved bridging portion and a distal end, the bridging portion extending to an underside of the desktop such that the distal end opposes an extension of the housing on an upper side of the desktop. The clamping assembly binds the desktop between the arm and the housing. A first embodiment of the clamping assembly includes a retention tube received in the housing having a first end and a threaded second end. A clamp is pivotally connected to the retention tube first end. A shaft has a threaded portion and a head. The threaded portion is received in the retention tube threaded second end and the bead is received in an arm bore such that turning the clamp engages the shaft to move the arm closer to the housing thereby binding the desktop between the arm and the housing. A second embodiment of the clamping assembly includes a bolt having a threaded portion and a knob. The threaded portion is received in the threaded bore of the housing such that turning the knob brings the arm closer to the housing thereby binding the desktop between the arm and the housing.

11 Claims, 4 Drawing Sheets

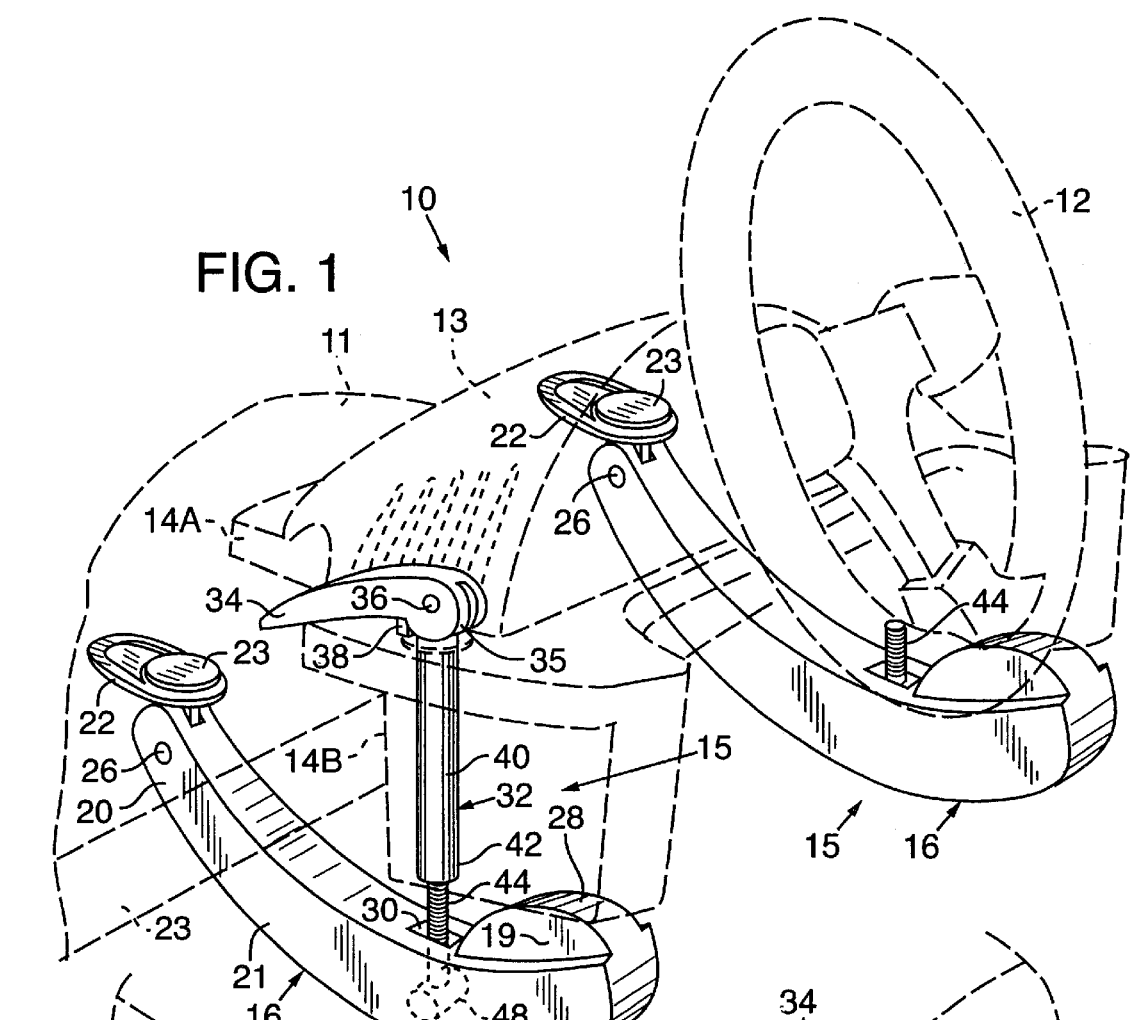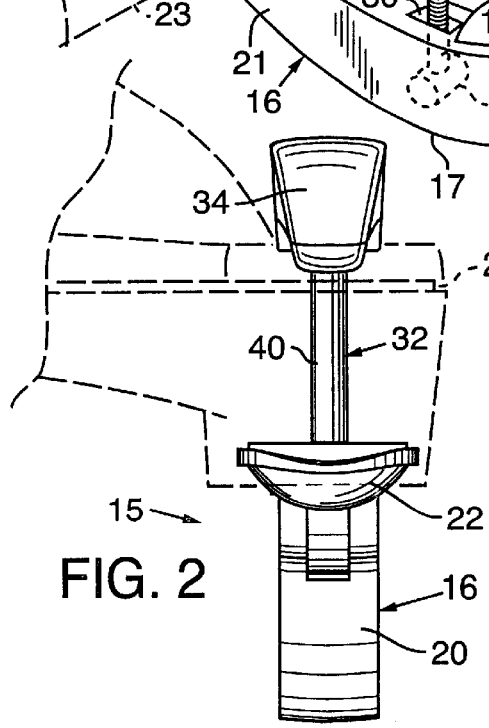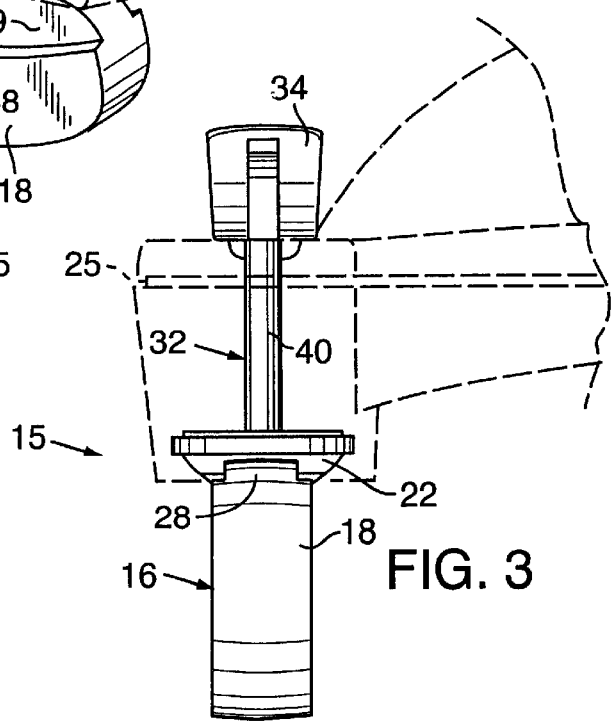

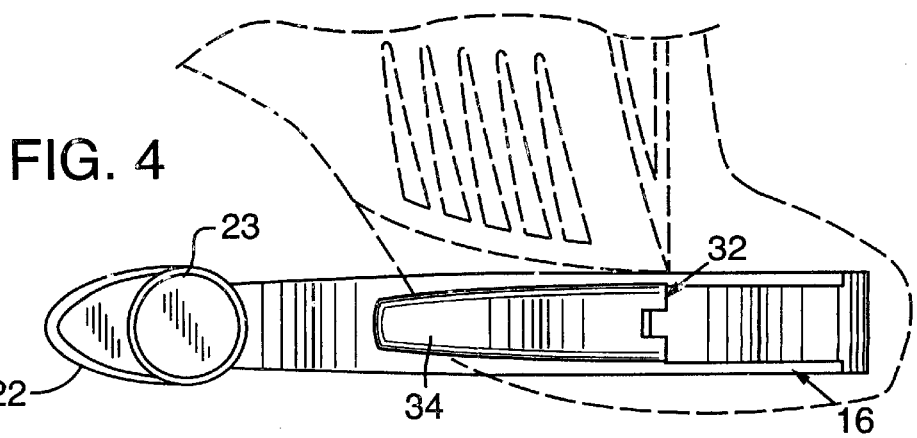
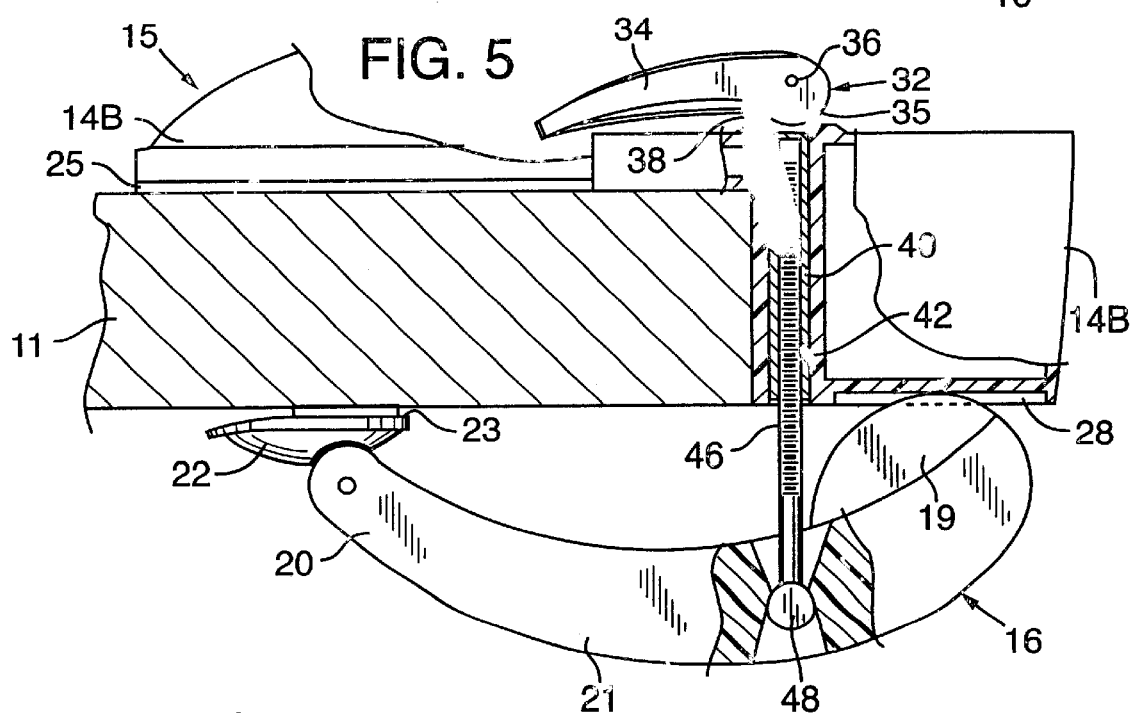
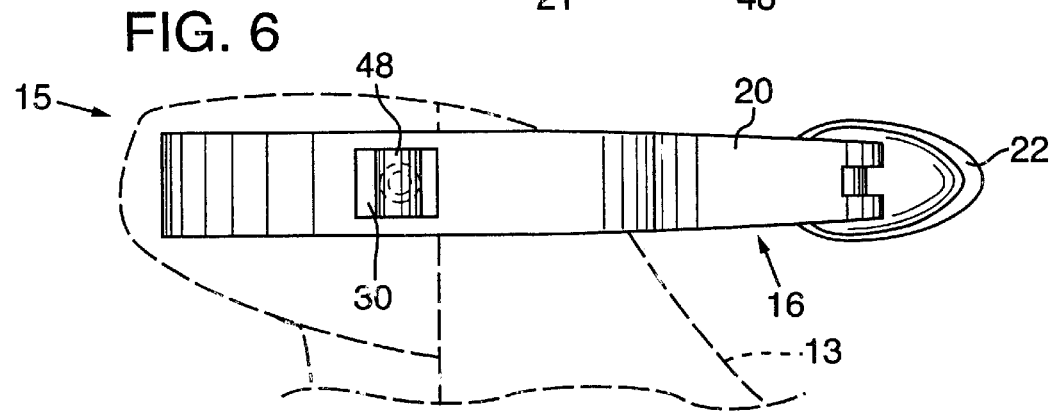

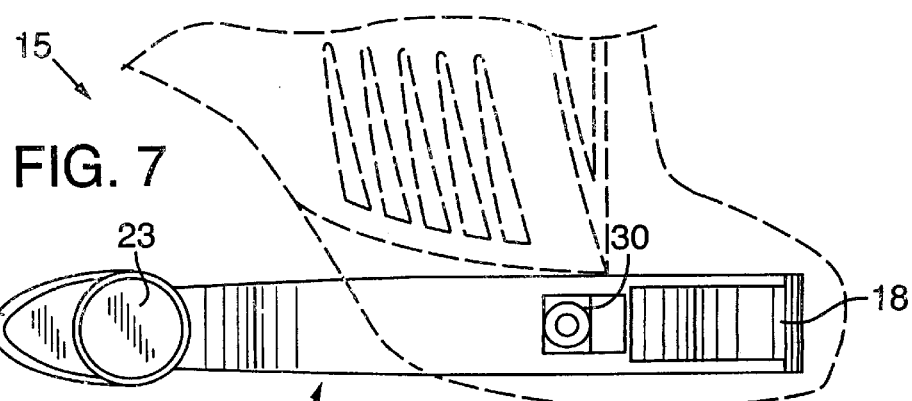
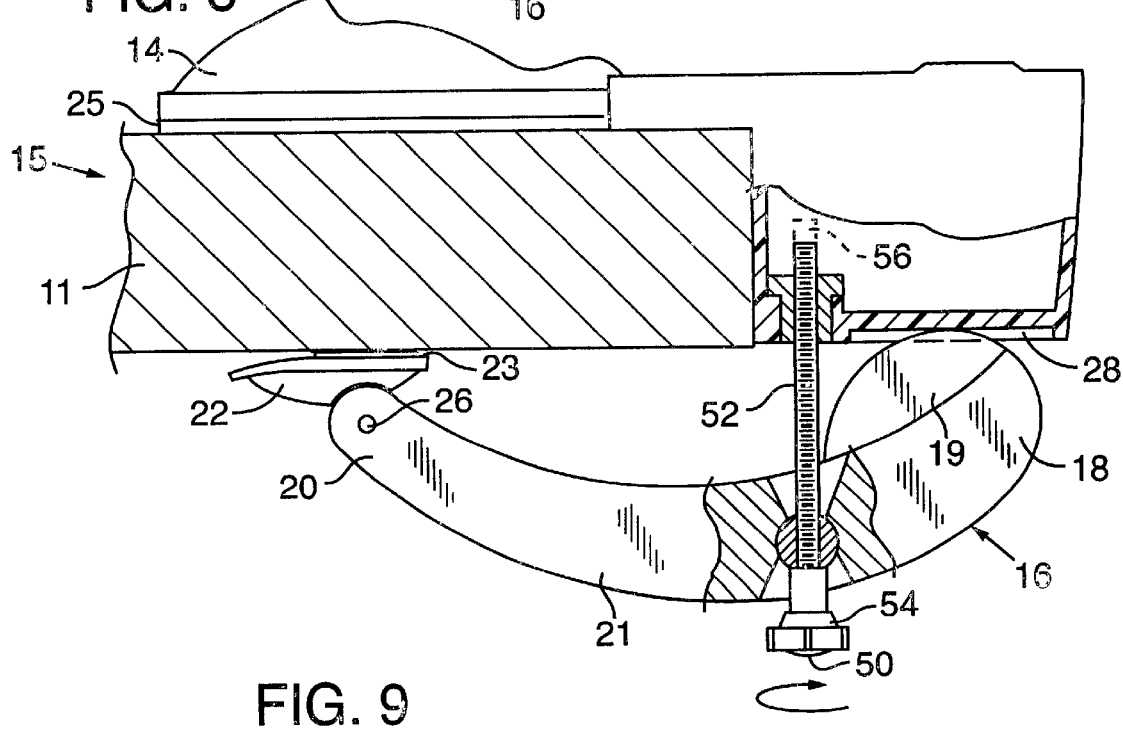
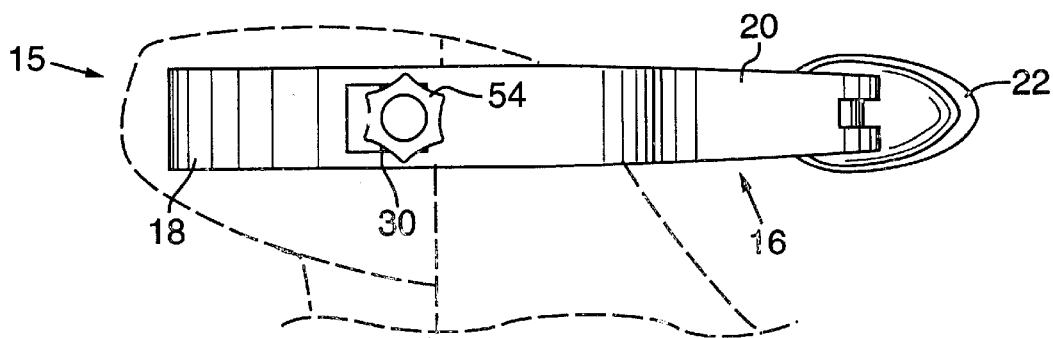

CONTROLLER FOR GAMES OR SIMULATION PROGRAMS WITH CLAMP FOR DESKTOP MOUNTING

BACKGROUND OF THE INVENTION

1. Field of the Invention

This invention relates generally to controllers for games and simulation programs implemented on a personal computer ("PC") or video game machines and, more particularly, to a controller having a specially adapted clamp for desktop mounting of the controller.

2. Description of the Prior Art

Conventionally, either a PC running a game or simulation program or a specialized video game system receives input from an external input device, such as a user-operated game controller. PC's generally come equipped with a game or other port where an external controller can be plugged in. Video game systems generally come with at least two ports for controller input. Controllers provide an essential key to the functioning and a enjoyment of a video game or simulation by providing the necessary link between a user's actions and the signal input into the PC or game system. A controller senses the user's actions and converts them into electronic signals which are transmitted to the PC or game system and used to control the video game or simulation. The game or simulation can thereby react to the user's actions. In order to satisfy consumer desires and expectations, therefore, a controller must accurately interpret and transfer the input from the operator to the machine, and additionally should provide for comfortable use and full functionality.

Various controllers and simulation devices have been developed which attempt to satisfy an operator's desires for realistic control, comfortable use, quick response, accurate input transfer and ease of button/function access. These devices include: single-handed controllers, analog controllers, digital controllers, two-handed controllers, joystick controllers, throttle devices, steering wheel inputs, gun-shaped controllers, foot controllers, and much more; each of them strives to meet consumer needs for a more enjoyable gaming experience. Even with all these devices, however, there still remain several industry-wide problems.

One problem particular to steering wheels used for racing game applications is providing a steering wheel that attaches rigidly to a desktop, table, or other like substantially flat horizontal surface. Racing wheels developed to date do not anchor the wheel sufficiently to withstand the rotational force applied when the user turns the wheel to manipulate the game object. This is particularly true when the user attempts to interact actively and forcefully with the game or simulation program. If the wheel is not securely anchored, the wheel will move around on the desktop or worse yet, detach in the middle of a game. When this happens, the user's enjoyment is diminished.

A solution to this problem has been to semi-permanently attach the wheel to the desktop. A controller of this kind is typically attached to the desktop using fasteners such as screws. Use of screws or other like fasteners requires drilling holes into the desktop to receive the screws or fasteners, which permanently damage the desktop surface. Locating the holes on the desktop so that the wheel is correctly positioned is an additional hurdle that the user must meet before she can use the steering wheel to play the racing game.

Moreover, once the wheel is attached using screws or other fasteners, it is difficult to move or remove. In order to move the wheel out of the way or to another desktop, each of the screws or fasteners attaching the wheel must be unscrewed. Once the screws or fasteners are loosened, the adjustments required to position the wheel on the desktop must be repeated when the wheel is reinstalled. If the wheel is moved to a new desktop, a new set of receiving holes must be drilled in the new surface. As with reinstalling the steering wheel, moving the wheel to a new desktop requires a new set of adjustments to adequately position the wheel on the new desktop.

Accordingly, a need remains for a way to attach a steering wheel or other controller for use in playing PC and video games rigidly to and without permanently damaging the desktop, table, or other flat horizontal surface, adjusts simply, and detaches effortlessly for storage or moving to a different location.

SUMMARY OF THE INVENTION

It is therefore an object of the present invention to overcome the disadvantages associated with prior art steering wheel game controllers for use with car racing games or simulations running on a PC or video game machine.

An additional object of the invention is to attach a game controller easily, rigidly, and removably to a desktop, table, or other substantially flat horizontal surface.

Another object of the invention is to provide a controller attachment mechanism which does not require complicated adjustments before use.

Yet another object of the invention is to provide a controller which is effortlessly attached securely to a desktop and detached for storing or moving to a different location.

The present invention is a controller for use with racing games and simulations running on a PC or video game machine which includes a specially adapted clamp for desktop mounting. A particular embodiment of the controller includes a housing for removably attaching the controller to a desktop and means, such as a rotatable steering wheel, joystick, throttle, yoke, or other hand-operable control member, mounted to the housing for manipulating the game object. The housing is arranged to rest on a desktop, along an edge thereof. A clamping assembly is received in the housing and extends below the desktop near its edge. An adjustable arm is pivotally connected to the clamping assembly and includes a proximal end, a substantially curved or arcuate bridging portion, and a distal end, the bridging portion extending to an underside of the desktop such that the distal end opposes a portion of the housing on an upper side of the desktop. The proximal end of the arm pivotally engages an underside of the housing at a position spaced from the edge of the desk. The clamping assembly is contracted to bind or clamp the desktop between the arm and the housing.

A first embodiment of the clamping assembly includes a retention tube received in the housing having a first end and a threaded second end. A clamp member is pivotally connected to the retention tube first end. A shaft has a threaded portion and a head. The threaded portion is received in the retention tube threaded second end and the head is received in a bore in the arm such that turning the clamp engages the shaft to move the arm closer to the housing. The clamp includes a cam which engages the housing to retract or release tension on the shaft.

A second embodiment of the clamping assembly includes a bolt having a threaded portion and a knob. The threaded portion is received in the threaded bore of the housing such that turning the knob tensions the bolt and brings the arm closer to the housing.

A second embodiment of the arm assembly includes an arm having two bifurcated portions extending from a common proximal end. The bifurcated portions extend to the underside of the desktop to oppose a portion of the housing positioned on the upper side of the desktop. A third embodiment of the clamping assembly includes a pivot member, a threaded portion, and a lever. The threaded portion extends from the pivot member which is received in a pocket of the arm. The threaded portion is received in a bore in the arm assembly and a threaded bore in the housing such that turning the lever engages the threads in the threaded portion with the threads in the threaded bore of the housing and clamps the desktop between the arm assembly and the housing of the controller.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a perspective view of the controller according to a preferred embodiment of the present invention, the steering wheel housing and desk shown in dashed lines and the attachment assembly in solid lines;

FIG. 2 is a rear view of the desktop attachment assembly shown in FIG. 1;

FIG. 3 is a front view of the desktop attachment assembly shown in FIG. 1;

FIG. 4 is a top view of the desktop attachment assembly shown in FIG. 1 with the desktop omitted;

FIG. 5 is a cross-sectional side view of the desktop attachment assembly shown in FIG. 1;

FIG. 6 is a bottom view of the desktop attachment assembly shown in FIG. 1 with the desktop omitted;

FIG. 7 is a top view similar to FIG. 4 of a second embodiment of the desktop attachment assembly with the desktop omitted;

FIG. 8 is a cross-sectional side view of the second embodiment of the desktop attachment assembly;

FIG. 9 is a bottom view of the second embodiment of the desktop attachment assembly with the desktop omitted;

DETAILED OF DESCRIPTION OF THE PREFEFRRED EMBODIMENT

Figure 10:
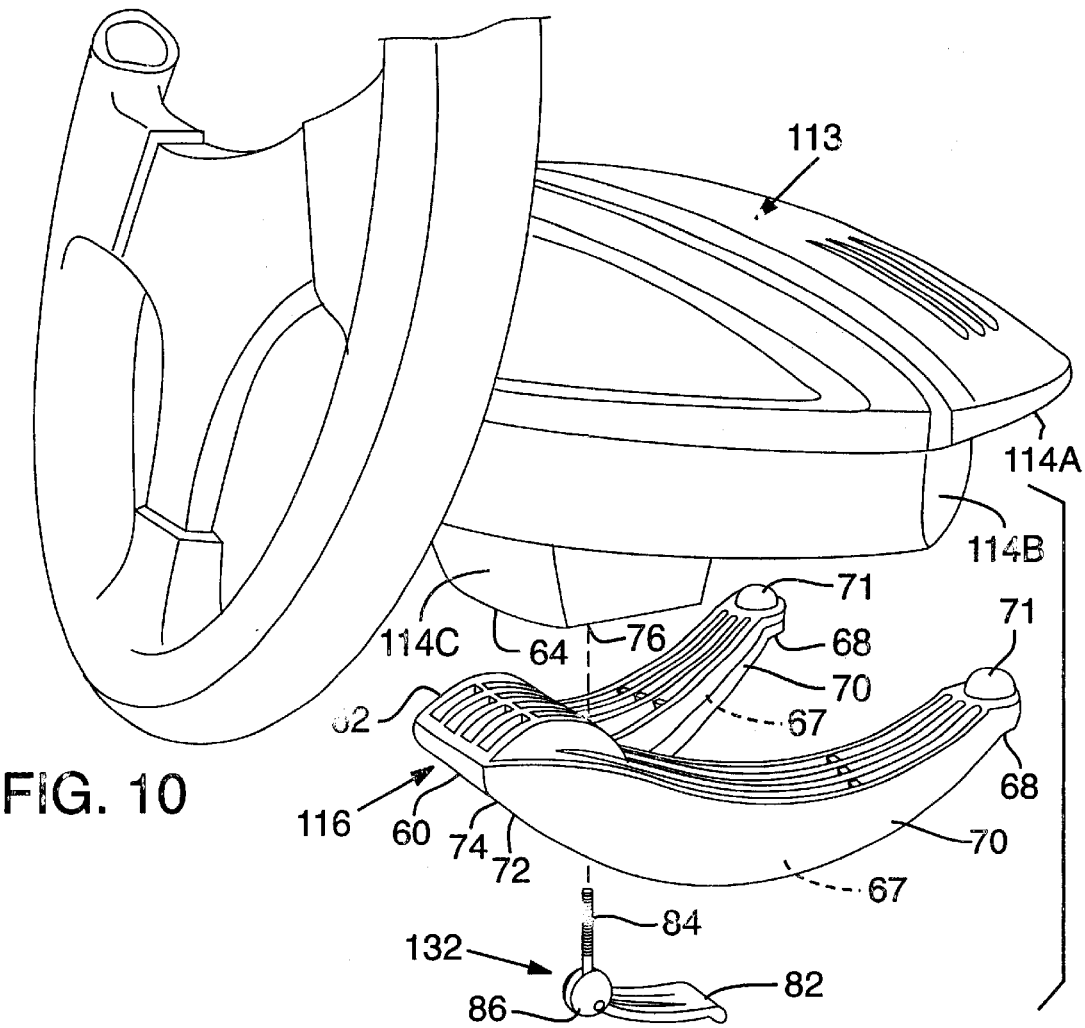
FIG. 10 is a perspective view of third embodiment desktop attachment assembly.

FIG. 1 is a perspective view of the steering wheel controller 10 according to a preferred embodiment of the present invention. The steering wheel controller 10 includes a steering wheel 12 rotatably mounted to a housing or body 13 positioned on an upper side of the desktop 11. The housing includes the connectors (not shown) and other electronics (not shown) necessary to electrically couple the steering wheel to the PC. Housing 13 includes a base 14A and an abutment 14B on each side of the body. Base 14A supports the housing on a desktop and receives the attachment assembly 15. For simplicity, only one attachment assembly 15 is shown in full in FIG. 1. An identical attachment assembly 15 is generally located on an opposite side of the steering wheel 12 to provide symmetrical support for the steering wheel 12.

The attachment assembly 15 will be described with reference to FIGS. 1–6. The attachment assembly 15 includes an arm assembly 16 and a clamping assembly 32. When clamped down, the arm assembly 16 extends under the desktop 11 and is positioned opposed to base 14A of housing 13 to secure the steering wheel controller 10 to the desktop 11. When released, the arm assembly 16 rotates loosely while remaining attached to the clamping assembly 32 through shaft 44.

The arm assembly 16 includes an arm 17, a rocker 19, a foot 22, and a bore 30. The arm 17 is formed with a curved bridging portion 21, a first or proximal end 18 with a rounded half moon rocker 19, and a second or distal end 20 carrying foot 22. As best shown in FIGS. 1 and 5, the bridging portion 21 extends under the desktop 11 opposing the housing base 14A positioned on the upper side of the desktop 11. The bridging portion 21 bridges desk forward edge 23, which can have a variety of widths.

The rocker 19 at the first end 18 of the arm 17 is received in a rectangular pocket 28 (FIG. 5) in the underside of abutment 14B. This arrangement allows the arm to pivot about in a horizontal axis in pocket 28 thereby providing for easy installation on a variety of desktops, including desktops with irregular or non-flat surfaces. The rounded feature 19 is received lengthwise in the pocket 28 of the housing 13. The pocket 28 prevents the arm 17 and the housing 13 from twisting horizontally once installed on desktop 11. Alternatively, but less preferred a hinge or pivot pin can be used to engage the proximal end of the arm 18 to the abutment 14B.

The arm assembly 16 includes a foot 22. The foot 22 is pivotally attached to the arm 17 at the second end 20 using the foot pin 26. The foot 22 pivots about the pin 26 and includes a pad or cover 24 preferably made of an elastomer or other like material. The pad 24 is positioned between the foot 22 and the underside of the desktop 11 when the steering wheel controller 10 is installed. Similar elastomer pads 25 (FIGS. 2 and 3) are preferably attached to the underside of the housing 13 and positioned between the base 14A of housing 13 and the upper side of the desktop 11. When the clamp 34 is turned in one direction bringing the arm assembly 16 closer to the housing 13, the pad 24 and the elastomer pads or covers 25 on the housing yield slightly increasing the frictional force between the underside of desktop 11 and arm 17 and the upper side of desktop 11 and the housing 13 thereby fixing the position of the steering wheel controller 11.

The clamping assembly 32 is received, at a first end, in the housing member 13 and, at a second end, in the bore 30 of the arm assembly 16. The clamping assembly 32 includes a clamp 34 attached to a hollow substantially cylindrical retention tube 40 at clamp pin 36. The retention tube 40 includes a threaded end 42 for receiving a shaft 44. The shaft 44 includes a threaded end 46 and a pivot cylinder 48 (not shown) at an opposite end. The pivot cylinder 48 is disposed perpendicularly to the shaft 44 axis. The pivot cylinder 48 is received in the preferably rectangular bore 30. The pivot cylinder 48 prevents the shaft 44 from rotating inside bore 30 when the clamp 34 is rotated. The threaded end 46 of shaft 44 is received in the hollow retention tube 40 and engaged by the retention tube threaded end 42 thereby attaching the shaft 44 to the clamp 34. The clamp 34 includes a cam 35 which engages housing 13 to retract or release tension on the shaft 44. The clamp 34 has a clamped position and a released position. The clamped position is shown in FIGS. 1 and 3. The released position is not shown.

The steering wheel assembly 10 is attached to a desktop 10 in the following manner. The housing member 13 is first positioned on top of the desktop 11. At this point, the clamp 34 is in the released position which allows the arm assembly 16 to pivot about the rocker 19 and the clamping assembly 32. The arm 17 is positioned underneath the desktop 11 which brings foot 22 into contact with the underside of desktop 11. Note that because foot 22 pivots about pin 26, the underside of the desktop 11 need not be completely horizontal but can have a slight angle.

The clamp 34 is rotated in a first direction to further engage the threaded end 46 of the shaft 44 with the threaded end 42 of the retention tube 40. By rotating the clamp 34, the arm assembly 16 is brought closer to the housing 13 and tightened against the desktop 11 thereby securing the steering wheel controller 10 to the desktop 11. Once the steering wheel controller 10 is positioned and tightened against the desktop 11, the clamp 34 is moved to the clamped position by pushing the clamp 34 down from a vertical position to a horizontal position thereby fixing the position of the steering wheel on desktop 11. When the clamp 34 is turned in one direction bringing the arm assembly 16 closer to the housing 13, the pad 24 and the elastomer pads or covers 25 on the housing yield slightly increasing the frictional force between the underside of desktop 11 and arm 17 and the upper side of desktop 11 and the housing 13 thereby fixing the position of the steering wheel controller 11. To release the steering wheel controller 10, the clamp 34 is first lifted up from the horizontal clamped position to a vertical released position. The clamp 34 is then rotated in a second direction to disengage the threaded end 46 of the shaft 44 with the threaded end 42 of the retention tube 40. Rotating the clamp 34 in this manner moves the arm assembly 16 farther from the housing 13.

The attachment assembly 15 shown in FIGS. 7–9 includes an arm assembly 16 and a second embodiment of the clamping assembly 32. The arm assembly 16 shown in FIGS. 7–9 is substantially identical to the arm assembly 16 shown in FIGS. 1–6. The second embodiment of the clamping assembly 32 has a threaded bolt 50 which includes a pivot cylinder 48 (not shown), a bolt shaft 51, a threaded shaft section 52, and a knob 54. The pivot cylinder 48 (not shown) is received in the preferably rectangular bore 30 of arm assembly 16. The pivot cylinder 48 includes a pivot bore 49. The threaded bolt 50 is received in the pivot bore 49 and the arm assembly bore 30. The pivot cylinder 48 prevents the arm 17 from rotating inside bore 30 when the knob 54 is rotated. The threaded shaft section 52 is received in threaded bolt receptacle 56 in housing member 13.

To secure the steering wheel controller 10, the knob 54 is rotated in a first direction engaging the threaded shaft section 52 with the threaded receptacle 56. By rotating the knob 54, the arm assembly 16 is brought closer to the housing 13 and tightened against the desktop 11 thereby securing the steering wheel controller 10 to the desktop 11. To release the steering wheel controller 10, the knob 54 is rotated in a second direction moving the arm 17 away from the housing 13.

Figure 11:
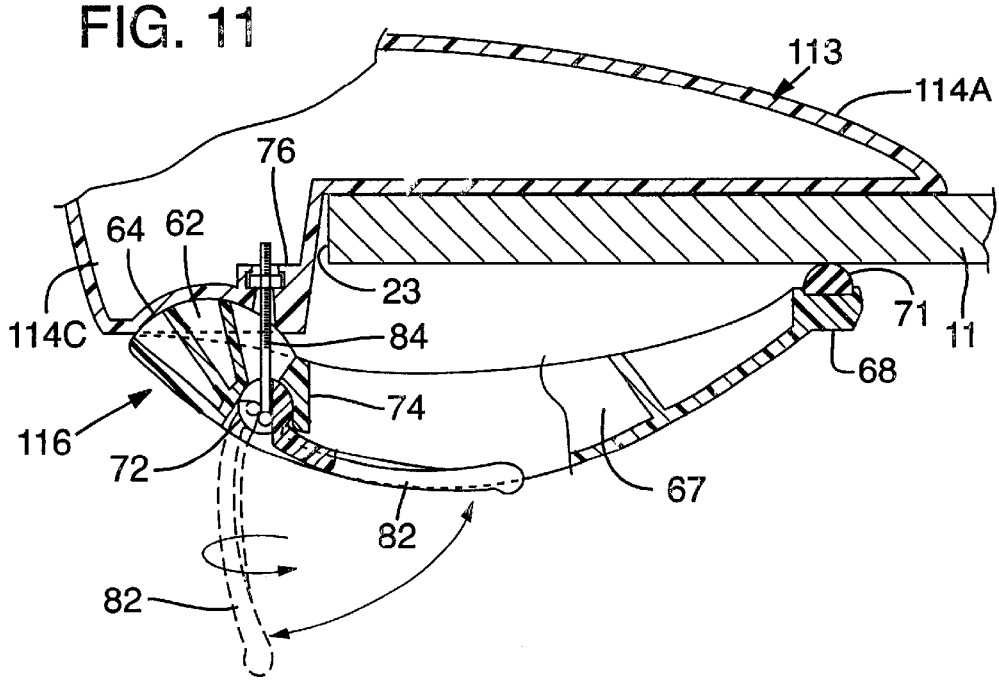
FIG. 11 is a cross-sectional side view of the third embodiment desktop attachment assembly shown in FIG. 10.

The attachment assembly 15 shown in FIGS. 10–11 includes a second embodiment of the arm assembly 116 and a third embodiment of the clamping assembly 132. When clamped down, the second embodiment of the arm assembly 116 shown in FIGS. 10–11 extends under the desktop 11 and is positioned opposed to base 114A of housing 13 to secure the steering wheel controller 10 to the desktop 11. When released, the arm assembly 116 rotates loosely about pivot member 86 while remaining attached to the clamping assembly 132 through threaded portion 84.

The arm assembly 116 includes two bifurcated portions 70, a rocker 62, a foot 71, and a bore 74. Each of the bifurcated portions 70 is formed with bridging portion 67 extending from a common proximal end 66 of the arm assembly 16 to distal end 68. The bridging portion 67 extends under the desktop 11 opposing the housing base 114A positioned on the upper side of the desktop 11. The bridging portion 67 bridges desk forward edge 23, which can have a variety of widths.

The rocker 62, positioned at the proximal end 66 of the arm assembly 16, is received in a pocket 64 in the underside of abutment 114C. Abutment 114C is a winged extension of base 114A that braces forward edge 23 of desktop 11. This arrangement allows the arm assembly 116 to pivot about in a horizontal axis in pocket 62 thereby providing for easy installation on a variety of desktops, including desktops with irregular or non-flat surfaces. The rocker 62 is received lengthwise in pocket 64 of the housing 13. The pocket 62 prevents the arm assembly 116 and the housing 13 from twisting horizontally once installed on desktop 11. Alternatively, but less preferred a hinge or pivot pin can be used to engage the proximal end 66 of the arm assembly 16 to the abutment 114C. The foot 71 is formed on each distal end 68 of each of the bifurcated portions 70 of the arm assembly 16. The foot 71 is a simplified version of foot assembly 22 and is rounded to facilitate installation of the controller 10 on desktops 11 having irregular or non-flat underside surfaces.

The third embodiment of the clamping assembly 132 shown in FIGS. 10–11 includes a threaded portion 84, a lever 82, and a pivot member 86. The threaded portion 84 of the clamping assembly 132 extends substantially upward from the pivot member 86. The threaded portion 84 of the clamping assembly 132 is received in bore 74 of the arm assembly 116 and in the threaded bore 76 of the abutment 114C of the housing 13. The lever 82 also extends from pivot member 86 which is received in pocket 72 of the arm assembly 116. Pivot member 86 and lever 82 are pivotally connected to the threaded portion 84.

The clamping assembly 132 operates as follows. The threaded portion 84 of the clamping assembly 132 is received in bore 74 of the arm assembly 116 and in the threaded bore 76 of the housing 13. In an unclamped position, the arm assembly 116 loosely pivots about pivot member 86 which is received in pocket 72 thereby allowing the controller 10 to be positioned on the upper side of desktop 11. Once the controller 10 is positioned and ready to be secured, the threaded portion 84 of the clamping assembly 132 is engaged by the threaded bore 76 of the housing 13 thereby clamping the desktop 11 between the arm assembly 116 and the base 14A of the housing 13.

The housing 13, the arm assembly 16 and 116, the clamping assembly 32 and 132, and the bolt 50 can be formed of a variety of hard, durable, and inexpensive materials such as plastic.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A controller for manipulating a game or simulation program running on a personal computer on which a game object is displayed, the controller comprising:

a housing for removably attaching the controller to a desktop;

a clamping assembly received in the housing; and an adjustable arm assembly for binding the desktop between the arm and the housing, the adjustable arm assembly including two bifurcated arms having two substantially curved bridging portions commonly attached at proximal ends and a predetermined distance apart at distal ends, the distal ends of the bridging portions extending to an underside of the desktop such that the distal ends oppose a base of the housing positioned on an upper side of the desktop, the adjustable arm being pivotally coupled to the housing.

2. A controller according to claim 1 including a steering wheel rotatably mounted to the housing for manipulating a game object.

3. A controller according to claim 1
wherein the housing includes a first elastomer pad positioned between an underside of the housing and the upper side of the desktop; and
wherein each of the distal ends of the bifurcated arms includes a second elastomer pad positioned between the underside of the desktop and an upper side of the distal ends.

4. A controller according to claim 1 wherein the clamping assembly includes:
a pin having a threaded portion at a first end;
a rounded pivot member attached to the pin at a second end; and
a rotating arm attached to the pivot member and adapted to rotate the pivot member such that the pin is threaded into the housing.

5. A controller according to claim 4 wherein the clamping mechanism includes a first and a second position, the rotating arm rotating the pivot member in a first position and securing the adjustable arm assembly in the second position.

6. A controller for use with a game or simulation program running on a personal computer, comprising:
a body;
means mounted to the body for manipulating a game object;
an adjustable arm having at least two bifurcated bridging portions extending to an underside of the desktop, each bifurcated bringing portion including a distal end opposing a portion of the body on an upper side of the desktop, a proximal end, and a bore located on the proximal end, the at least two bifurcated bridging portions being commonly connected their proximal ends; and
a clamping assembly having a threaded end and a second end received in the arm bore for binding the desktop between the arm and the body.

7. A controller according to claim 6 including a clamping mechanism received in the body including a hollow shaft having a first end and a threaded end and a clamp pivotally connected to the shaft first end.

8. A controller according to claim 7 wherein the second end of the bolt includes a cylindrical head wherein the first end of the bolt is received in the threaded end of the hollow shaft and the cylindrical head is received in the arm bore, the bolt being engaged by the clamping mechanism such that turning the clamp in one direction moves the arm closer to the body binding the desktop between the arm and the body and turning the clamp in another direction moves the arm away from the body releasing the desktop from between the arm and the body.

9. A controller according to claim 6 wherein the adjustable arm comprises an elastomer pad positioned between each distal end of the bifurcated bringing portion and the underside of the desk for preventing the controller from slipping during use.

10. A controller according to claim 6 wherein the proximal end of the adjustable arm includes a rocker pivotally engaged to a pocket in the body for adjusting the arm to desktops having varying widths.

11. An attachment assembly for removably attaching a controller having a body to a desktop, the controller including means for manipulating a game object in a game or simulation program running on a personal computer, comprising:
an arm having substantially curved bifurcated bridging portions extending from a common proximal end, each bridging portion extending to an underside of the desktop such that its distal end substantially opposes the controller body on an upper side of the desktop; and
clamping means received in the body of the controller and coupled to the arm for contracting the arm closer to body and binding the desktop between the arm and the body thereby securing the controller to the desktop
wherein the clamping means includes:
a pivot member;
a threaded portion extending substantially upward from the pivot member and being received in a bore of the arm; and
a lever extending from the pivot member;
wherein the pivot member and the lever are pivotally connected to the threaded portion.

* * * * *

UNITED STATES PATENT AND TRADEMARK OFFICE
CERTIFICATE OF CORRECTION

PATENT NO. : 6,378,826 B1
DATED : April 30, 2002
INVENTOR(S) : Knaub et al.

It is certified that error appears in the above-identified patent and that said Letters Patent is hereby corrected as shown below:

<u>Column 7,</u>
Line 47, "connected their proximal" should read -- connected at their proximal --.

Signed and Sealed this

Eleventh Day of February, 2003

JAMES E. ROGAN
*Director of the United States Patent and Trademark Office*